United States Patent
Rist et al.

(10) Patent No.: US 9,731,435 B2
(45) Date of Patent: Aug. 15, 2017

(54) INTEGRAL IRRADIATION UNIT

(75) Inventors: Stefan Rist, Leverkusen (DE); Clemens Trumm, Sankt Augustin (DE); Holger Albrecht, Bergisch Gladbach (DE)

(73) Assignee: Momentive Performance Materials GmbH, Leverkusen (DE)

( * ) Notice: Subject to any disclaimer, the term of this patent is extended or adjusted under 35 U.S.C. 154(b) by 1043 days.

(21) Appl. No.: 13/579,144

(22) PCT Filed: Feb. 7, 2011

(86) PCT No.: PCT/EP2011/051743
§ 371 (c)(1),
(2), (4) Date: Oct. 10, 2012

(87) PCT Pub. No.: WO2011/101269
PCT Pub. Date: Aug. 25, 2011

(65) Prior Publication Data
US 2013/0026682 A1    Jan. 31, 2013

(30) Foreign Application Priority Data

Feb. 19, 2010  (DE) .................. 10 2010 002 141

(51) Int. Cl.
*B29C 35/08* (2006.01)
*B29C 33/06* (2006.01)
(Continued)

(52) U.S. Cl.
CPC .......... *B29C 35/0805* (2013.01); *B29C 33/06* (2013.01); *B29C 33/40* (2013.01);
(Continued)

(58) Field of Classification Search
CPC ................ B29C 33/06; B29C 35/0805; B29C 2035/0827; B29C 2045/0075;
(Continued)

(56) References Cited

U.S. PATENT DOCUMENTS 4,728,469 A * 3/1988 Danner ............... B29C 33/0038
264/1.38
4,879,318 A * 11/1989 Lipscomb ........... B29C 33/0038
425/174.4

(Continued)

FOREIGN PATENT DOCUMENTS

DE    19619999 A1    11/1997
JP    11-179739       7/1999
(Continued)

OTHER PUBLICATIONS

Espacenet Bibliographic Data for DE 19619999 published Nov. 20, 1997, one page.
(Continued)

*Primary Examiner* — Seyed Masoud Malekzadeh
(74) *Attorney, Agent, or Firm* — Rankin, Hill & Clark LLP

(57) ABSTRACT

The invention relates to an integral irradiation unit for hardening light-hardening polymer compositions, a method for producing hardened polymer molded bodies or bodies coated with hardened polymers using the integral irradiation unit, and to the use of the integral irradiation unit for producing molded polymer bodies or bodies coated with polymers.

22 Claims, 4 Drawing Sheets

Irradiation unit with activation in the injection gate for injection-overmolding inserts

(51) Int. Cl.
  *B29C 33/40* (2006.01)
  *B29C 45/14* (2006.01)
  *B29C 45/26* (2006.01)
  *B29C 45/27* (2006.01)
  *B29C 45/00* (2006.01)

(52) U.S. Cl.
  CPC .... *B29C 45/14778* (2013.01); *B29C 45/2673* (2013.01); *B29C 45/2701* (2013.01); *B29C 2035/0827* (2013.01); *B29C 2045/0075* (2013.01); *B29K 2995/0026* (2013.01)

(58) Field of Classification Search
  CPC .............. B29C 33/40; B29C 45/14778; B29C 45/2701; B29C 45/2673; B29K 2995/0026
  USPC ....................................................... 425/174.4
  See application file for complete search history.

(56) References Cited

U.S. PATENT DOCUMENTS

| | | | | |
|---|---|---|---|---|
| 5,807,906 | A * | 9/1998 | Bonvallot | B29C 35/0888 430/285.1 |
| 5,885,514 | A * | 3/1999 | Tensor | B29C 35/0888 264/259 |
| 6,627,124 | B1 * | 9/2003 | Herbrechtsmeier | B29C 35/0888 264/1.1 |
| 9,180,633 | B2 * | 11/2015 | Widman | B29D 11/00144 |
| 2003/0219571 | A1 * | 11/2003 | Tait | B29C 63/0013 428/192 |
| 2003/0219577 | A1 * | 11/2003 | Tait | B29C 63/0013 428/212 |
| 2005/0181196 | A1 * | 8/2005 | Aylward | B29C 44/22 428/304.4 |
| 2005/0253290 | A1 * | 11/2005 | Yokoyama | B29C 33/3857 264/1.1 |
| 2006/0267243 | A1 * | 11/2006 | Tindall | B29C 45/0001 264/211.11 |
| 2007/0018360 | A1 | 1/2007 | Kolesnychenko et al. | |
| 2008/0144196 | A1 * | 6/2008 | Kitamura | B29C 65/14 359/819 |
| 2008/0193749 | A1 * | 8/2008 | Thompson | B29D 11/0073 428/343 |
| 2008/0230958 | A1 | 9/2008 | Jin | |
| 2008/0246190 | A1 * | 10/2008 | Yokoyama | B29C 33/3857 264/446 |
| 2010/0181014 | A1 * | 7/2010 | Raymond | F24J 2/085 156/209 |
| 2010/0262272 | A1 * | 10/2010 | Shkolnik | B29C 67/0088 700/120 |

FOREIGN PATENT DOCUMENTS

| | | |
|---|---|---|
| JP | 2007-112025 | 5/2007 |
| WO | 2006/010632 A1 | 2/2006 |
| WO | 2007/108444 A1 | 9/2007 |

OTHER PUBLICATIONS

International Search Report for corresponding PCT/EP2011/051743 mailed Jul. 5, 2011, three pages.
Machine translation of JP11-179739 published Jul. 6, 1999, four pages.
Machine translation of JP2007-112025 published May 10, 2007, eight pages.

* cited by examiner

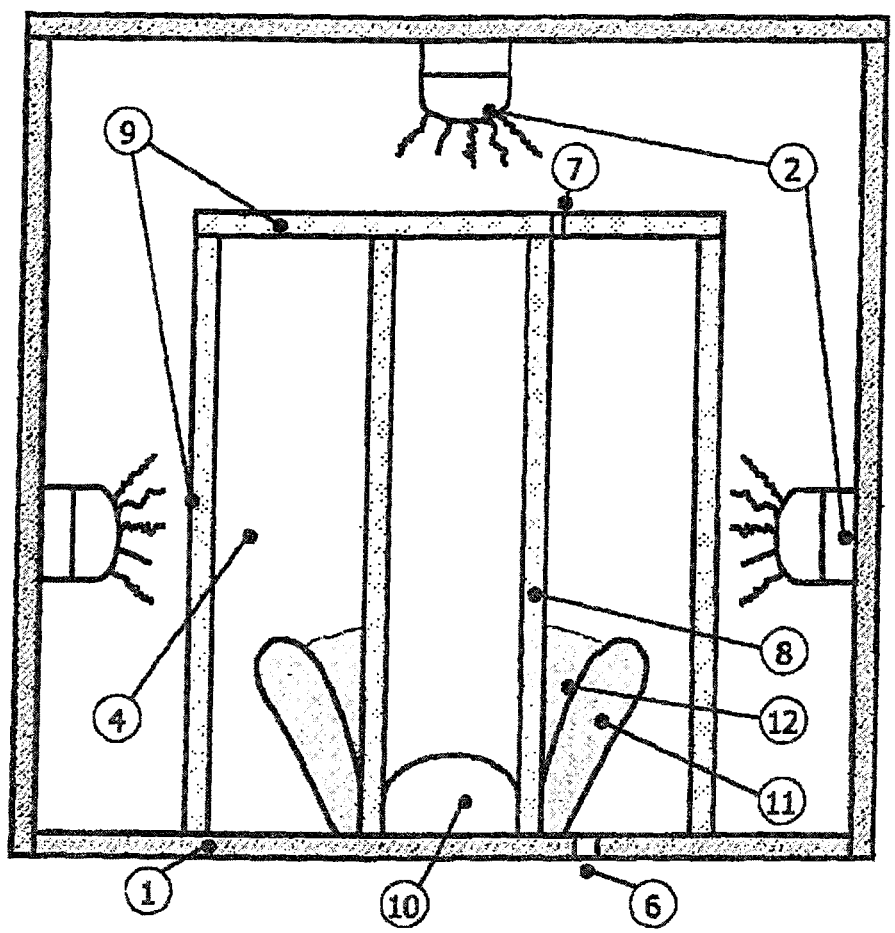
Figure 2a: Irradiation unit with reflecting elements

Figure 2b: Irradiation unit with reflecting elements
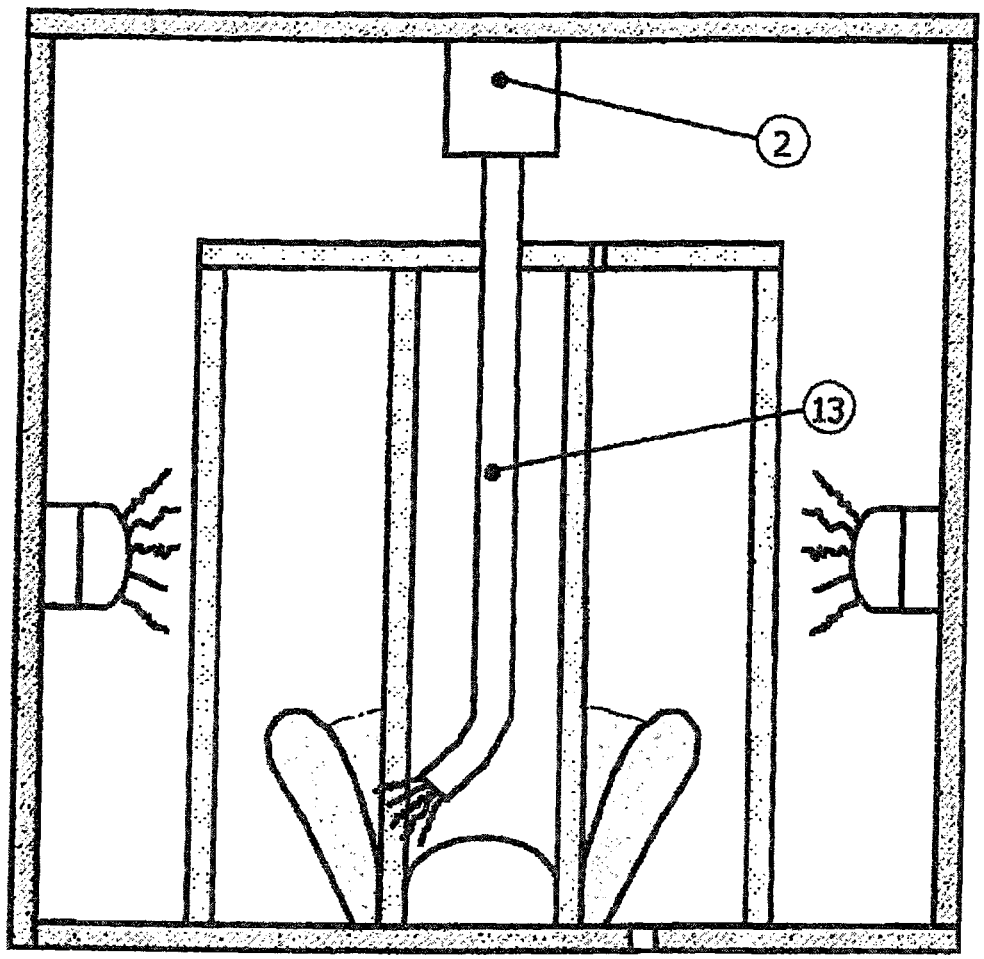

Figure 3: Irradiation unit with activation in the injection gate for injection-overmolding inserts
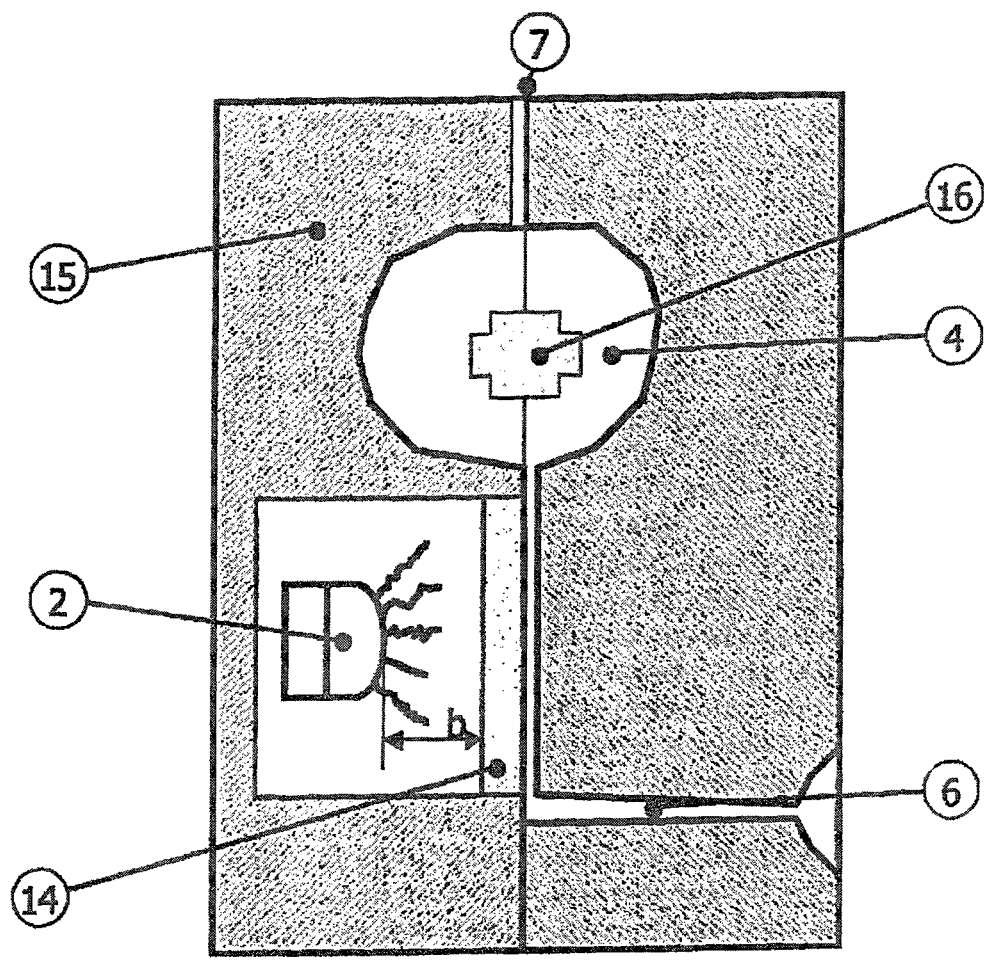

INTEGRAL IRRADIATION UNIT

The invention relates to an integral irradiation unit comprising UV light sources with a selected UV light spectrum for hardening light-hardening polymer compositions. The integral irradiation unit of the invention permits the highly efficient production of polymer molded bodies or polymer-coated bodies optionally in a continuous or discontinuous process.

The integral irradiation unit can be used for the production of molded bodies from light-hardenable polymers, particularly for the production of elastomer molded bodies, duromer molded bodies, thermoplastic molded bodies or molded bodies consisting of thermoplastic elastomers.

The design of many injection-molding machines demands a compact, integral mold that can be clamped into this machine at the location provided therefor (mold holding device). In this position, the machine-controlled filling, opening and closing of the mold cavities is possible. Large, voluminous irradiation units at this position would require complex injection molding machines that have to be manufactured individually, which would lead to a great increase in costs.

Molds with transparent windows are known from the prior art, which can be considered for shaping and chemically cross-linking light-hardenable polymers. U.S. Pat. No. 5,401,155 describes a metal mold with a light-transparent window on the front, which is mounted perpendicular to the light source. In U.S. Pat. No. 6,627,124, protection is sought for a two-part mold for producing lens bodies in which the one mold half consists of a light-transparent material. U.S. Pat. No. 5,885,514 teaches a process of how gaskets are formed and hardened on a gasket plate using a transparent upper and a lower mold half. US 2007/141739 A1 discloses the hardening of silicon molded articles for encapsulating light-emitting diodes (LEDs).

Because of the strong heat development of conventional light sources, the production of larger molded bodies from light-hardenable polymers with the light sources that were hitherto available always required a comprise between the available choice of UV light-transmissive, transparent elements and the admissible irradiated optical power. In order to provide inexpensive, easily processable and durable light-transmissive elements, i.e. windows, for this purpose, the transparent materials have to fulfill a number of requirements for the entrance of light. They have to let through the UV light of the desired wavelength as completely as possible, without absorption losses. In particular if they become part of the shaping mold cavity wall, they should be easy to shape, i.e. the desired contours of the mold wall should be capable of being designed and realized with simple means. For example, though quartz glass is ideal as a UV light-transmissive material which is also thermally stable and scratch-resistant, it is difficult to shape by surface-processing methods and has a high price. Though transparent elements consisting of quartz glass can of course be also used as a mold cavity wall or entrance window in a mold in such a way that reduces mechanical stress and decreases the danger of breakage, but their use is tied to certain conditions.

In this case, the brittleness of the quartz glass and the adhesion between the quartz and some photo-hardened polymers with which it can bond adhesively must be taken into consideration. This makes detaching the molded bodies after hardening difficult. Other saline or mineral glasses have similar advantages and disadvantages. The transparent thermoplastics, which can be considered as alternatives, often let the UV light through only incompletely, heat up in part, yellow or are not sufficiently thermally stable under the irradiation conditions known so far. On the other hand, it is advantageous that many transparent thermoplastic synthetic materials are easy to process into shaping elements for use in molding ducts or in or into mold cavities.

The inventors were now able to create an integral device in which, in particular, thermoplastic UV light-transmissive elements can be used without subjecting them to stress up to the limit of thermal stability, but at the same time to transmit a large optical power per unit of time into the polymer composition to be hardened. The transparent elements can be adapted with regard to their compatibility (interaction with the light-hardening polymers) to that of the light-hardenable polymers. As a result, shortened production cycles with a significantly higher light yield relative to the energy or radiation power used are obtained with the device according to the invention.

In addition, the integral irradiation device according to the invention also permits the production of smaller and larger components by an injection-molding process and the control and monitoring of the start and progress of cross-linking over longer periods of time.

The device leads to processing methods with a low mold temperature, which provides advantages, for example, for 2-component injection-molding if the composite component is heat-sensitive, or if injection-overmolding of inserts consisting of plastics with a low thermal stability is to be carried out.

The invention moreover permits the production and application of compact integral molds for producing light-hardened molded articles by uniting selected UV-transparent mold materials having a sufficient UV light-resistance and heat stability with new UV light sources, which generate less heat radiation per irradiated optical power.

The present invention therefore provides an integral irradiation unit (sometimes also referred to as device according to the invention) for hardening light-hardening polymer compositions, comprising:
one or more UV light sources in which the percentage of the total radiation in the range of >700 nm is less than 15%, and in the range <300 nm is less than 15%,
one or more mold cavities for receiving the light-hardening polymer compositions,
one or more elements which are transparent for the generated UV light and which are in contact with the light-hardening polymer composition,
optionally one or more light-conducting and/or light-reflecting elements, and
optionally one or more injection gates for the light-hardening polymer compositions.

The present invention moreover provides an integral irradiation unit for hardening light-hardening polymer compositions, comprising:
one or more UV light sources, selected from UV lamps with wavelength-selective filters and/or mirrors, UV LED and UV laser light sources, in which the percentage of the total radiation in the range of >700 nm is less than 15%, and in the range <300 nm is less than 15%.
one or more mold cavities for receiving the light-hardening polymer compositions,
one or more elements which are transparent for the generated UV light and which are in contact with the light-hardening polymer composition,
optionally one or more light-conducting and/or light-reflecting elements, and
optionally one or more injection gates for the light-hardening polymer compositions.

The integral irradiation unit of the invention is characterized in that it comprises an interconnected unit of mold cavity or cavities and certain UV light sources. It therefore constitutes an integral irradiation and molding unit. This can include the mold cavity and the UV light source forming a rigid unit. Moreover, this may indeed also include the connection between the mold cavity and the UV light source to be variable or moveable.

Furthermore, the integral irradiation unit can have an area for receiving changing mold cavities therein. The latter embodiment is particularly economically viable if different molds are alternately produced with the integral irradiation unit ("curing-on-demand") or if the mold cavities have to be replaced for maintenance reasons. Furthermore, the integral irradiation unit of the invention also includes the possibility that the UV light source(s), even if directly or indirectly connected to the mold cavity, is disposed so as to be moveable relative thereto, or that a light beam that is delimited in a planar manner is directed once or several times over a larger surface of a transparent element by a specific change of direction. For example, a UV laser light source can be moved back and forth in front of the transparent element, whereby the UV light sweeps completely or partially over the transparent element. Alternatively, the transparent element can also be moved and the UV light source can be fixed. Such a moveable arrangement is preferred particularly in the case of larger-scale axial molds, wherein the UV light source can be guided, for example, along the longitudinal axis of the mold cavity. The integral irradiation unit according to the invention permits the production of even large-volume molded bodies or molded articles at a high number of cycles in a common hardening reaction, "in one pour", so to speak, because problems with regard to the heat transfer into the mold cavity, as they are common in thermally hardening or thermally activatable systems, do not occur.

In principle, any photo or light-hardening compositions can be hardened with the irradiation unit according to the invention, such as, for example, various acrylates, acrylate derivatives, aliphatic or aromatic epoxides such as those disclosed in EP 0826431 A1, as well as vinyloxy derivatives, mercaptan-substituted aliphatic or aromatic monomers or oligomers, unsaturated polyesters, bisallyl-substituted ammonium compounds such as those disclosed in EP 548826 A2 or EP 1265942 A2, including mixtures thereof or mixtures with transparent fillers and silicone rubber compositions etc. Other light-hardening polymer, oligomer, and/or monomer compositions (A), which can optionally also be used in combination with the components (A1) and (A2), include, for example, various acrylates, acrylate derivatives, aliphatic or aromatic epoxides such as those disclosed in EP 0826431 A1, as well as vinyloxy derivatives, mercaptan-substituted aliphatic or aromatic monomers or oligomers, unsaturated polyesters, bisallyl-substituted ammonium compounds such as those disclosed in EP 548826 A2 or EP 1265942 A2, including mixtures thereof.

Light-hardening polymer compositions are preferred, such as photo-hardenable flowable polymer, oligomer, and/or monomer compositions, such as, for example, those comprising:
(A) one or more polymers, oligomers and/or monomers comprising one or more photo-reactive groups,
(B) one or more catalysts,
(C) optionally one or more sensitizers,
(D) optionally one or more inhibitors,
(E) optionally one or more components that are reactive with respect to component (A),
(F) optionally one or more fillers.

The component (A) can in particular be selected from flowable polyorganosiloxanes with photo-reactive or photo-hardenable functional groups.

In a preferred embodiment, the component (A) is selected from polyorganosiloxanes (A1), comprising siloxy units of the formula:

$$R_a R^1_b SiO_{(4-a-b)/2} \quad (1),$$

wherein the groups R, which can be identical of different from each other, are substituted or unsubstituted monovalent hydrocarbon groups that do not comprise any photo-reactive groups; the groups $R^1$, which can be identical of different from each other, are photo-reactive groups; and a and b are integers from 0 to 3 and constitute the indices for the respective siloxy unit (M, D, T or Q), i.e. for
M: a+b=3,
D: a+b=2,
T: a+b=1,
Q: a+b=0,
which on average comprise less than 10 mol-% of branching units (T, Q), and preferably have a viscosity of 0.01 to 100,000 Pa·s at 25° C., and wherein preferably the mole ratio is $R^1$/Si=2/10000 to 2/10, i.e. 2-10 to 0.2, and/or
(A2) photo-reactive polyorganosiloxanes of the formula

$$R_a R^1_b SiO_{(4-a-b)/2} \quad (1'),$$

wherein a and b are as defined above, which, however, on average comprise more than 10 mol-% branching units (T, Q), i.e. are resinous, which are solid or liquid at room temperature (25° C.). Photo-reactive polyorganosiloxanes (A2) with predominantly M, T and Q-units, wherein the mole ratio M/(Q+T)=0.4 to 4.0 and the mole ratio $R^1$/Si=0.01 to 0.50, are preferred.

Furthermore, mixtures of different components (A1), of different components (A2) as well as mixtures of one or more components (A1) with one or more components (A2) can be used as component (A).

In the polyorganosiloxane of the formula (1) or (1'), the monovalent hydrocarbon groups represented by R are preferably those with 1 to 10 carbon atoms, in particular 1 to 8 carbon atoms, such as, for example, alkyl groups selected from the group consisting of methyl, ethyl, propyl, isopropyl, butyl, isobutyl, tert-butyl, pentyl, hexyl, octyl and decyl, cycloalkyl units, such as, e.g., cyclopentyl and cyclohexyl, aryl units, such as, e.g., phenyl and tolyl, and aralkyl groups, such as, e.g., benzyl and phenylethyl.

To a certain extent, for example up to 20 mol-%, preferably up to 10 mol-%, still more preferably up to 5 mol-% (relative to the number of silicon atoms) alkoxy groups can also be present as group R in the polyorganosiloxanes of the formula (1), or (1'), such as those with 1 to 8 carbon atoms, in particular 1 to 4 carbon atoms, such as methoxy, ethoxy, propoxy and butoxy.

R is not limited to unsubstituted monovalent hydrocarbon (and optionally alkoxy groups), but also comprises substituted forms of these groups, wherein some or all of the hydrogen atoms bonded to carbon atoms are replaced by halogen atoms, cyano groups, alkoxy groups or the like, for example substituted hydrocarbon groups such as, e.g. chloromethyl, 3,3,3-trifluoropropyl and cyanoethyl and substituted alkoxy groups.

Methyl, phenyl and 3,3,3-trifluoropropyl residues on the silicon are preferred.

$R^1$ is a photo-reactive group selected from alkenyl groups, methacryloyl-containing groups, alkenyloxyalkyl-containing, such as vinyloxyalkyl-containing, cyclohexenylethyl, limonyl, dicyclopentadienyl, norbornenyl and epoxyalkyl-containing groups.

The (meth)acryloyl-containing groups include, for example, (meth)acryloxyalkyl groups, in which the alkyl group comprises 2 to 14 carbon atoms, such as, e.g. γ-acryloxypropyl and γ-methacryloxypropyl.

The vinyloxyalkyl groups include, for example, those groups in which the alkyl group comprises 3 to 8 carbon atoms, such as, e.g. vinyloxypropyl.

The epoxy-containing groups include, for example, glycidyloxyalkyl groups, in which the alkyl group comprises 3 to 14 carbon atoms, such as, e.g. γ-glycidyloxypropyl, and (3,4-epoxycyclohexyl)alkyl groups.

At least two, preferably 2 to about 10, photo-reactive groups represented by $R^1$ should be present per molecule. Polyorganosiloxanes cannot be hardened completely with less than two photo-reactive groups represented by $R^1$. It should be noted that $R^1$ can be bonded to a silicon atom at the end or in the middle of a molecule chain.

The photo-reactive groups $R^1$ can substantially be classified into 3 groups according to their reaction mechanism, such as that of the radically activatable groups, that of the cationically radically activatable groups and those groups capable of hydrosilylation.

The methacryloxypropyl, mercatopropyl, vinyloxyalkyl, vinyl and the γ-glycidyloxypropyl residues on the silicon are preferred.

The branched polyorganosiloxane (A2), which can preferably be used optionally, is a silicone resin which preferably comprises an increased quantity of reactive groups $R^1$, and can therefore contribute to an increased cross-linking density if used in the appropriate quantities. The components (A2) increases strength, tear propagation resistance and hardness. A similar effect is achieved by a component (A1) if it has a high concentration of 1-50 mol-% of the reactive groups $R^1$, relative to all Si atoms, and if it is used in an amount of 0.2 to 90% by wt., preferably 1 to 40% by wt., relative to the total amount of the components (A1), for example together with (a) further component(s) (A1), which preferably has only 0.01 to 0.9 mol-% reactive groups.

With such mixtures, the use of reinforcing fillers can be wholly or partially avoided, whereby the transparency of the composition can be maintained at a high level. A high degree of transparency of the light-hardening polymer compositions facilitates the deep penetration of the photo-activating UV radiation into the mold cavity in a method for producing molded articles from photo-hardenable polymers.

The silicone resin (A2) is synthesized, for example, by vinyldimethylmethoxysilane and tetramethoxysilane being mixed in a desired molar ratio, hydrolyzed, condensed into a polymer and, if required, equilibrated. In other syntheses, vinyltrimethoxysilane and tetramethoxysilane are cohydrolyzed in the desired ratio to introduce trifunctional T or Q groups. Accordingly, chlorosilanes or mixtures of chlorosilanes and alkoxysilanes can take the place of the alkoxysilanes. Water glass, for example, can also be used instead of tetramethoxysilane.

The use of hexaorganodisiloxanes, such as 1,3-divinyl-1,1,3,3-tetramethyldisiloxane, is also possible, which are added to the hydrolysate and condensed or equilibrated in the polymerization reaction.

The component (A2) can, for example, also be used with up to 90% by wt. (relative to the total amount of the components (A1) and (A2)), provided duromeric, brittle properties of the hardened composition are desired or accepted.

The component (B) is selected from one or more catalysts that can cause the photo-reactive groups in the component to harden. Depending on the type of photo-reactive groups or on the mechanism of hardening, the catalysts include, for example:

For radical hardening, i.e. $R^1$ is an alkenyl, methacryloyl, alkenyl, such as vinyl, allyl, hexenyl, cyclohexenylethyl, limonyl-, functional polyorganosiloxane (A), they include: Photoinitiators, such as acyiphosphinoxides, acetophenone, propiophenone, benzophenone, xanthol, fluorene, benzaldehyde, anthraquinone, triphenylamine, carbazol, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoinether, such as benzoinmethylether and benzoinbutylether, bis(4-dimethylaminophenol) ketone, benzylmethoxyketal and 2-chlorothioxanthone, photo-activatable peroxides, such as perbenzoate ester of the general formula:

wherein A is an alkyl or aryl group and B=hydrogen, alkyl, halogen, nitro, amino, or amido, such as t-butylperbenzoate and para-substituted derivatives thereof, such as t-butylperoxy-p-nitrobenzoate, t-butyl-peroxy-p-methoxybenzoate, t-butylperoxy-p-methylbenzoate and t-butylperoxy-p-chlorobenzoate, azo compounds, such as azodicarboxylester, azodicarboxylic acid amide or azodiisobutyronitril.

For cationic hardening, such as for epoxy-functional or alkenylether-functional, i.e. vinyloxy, propenoxy-functional polydiorganosiloxanes, they include:

Onium salts, such as described, for example, in U.S. Pat. No. 4,576,999:

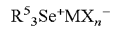

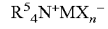

wherein $R^5$ can be identical or different and is selected from organic radicals with up to 30 carbon atoms, such as aromatic hydrocarbon residues; the onium anion is selected from the group $MX_n$, wherein $MX_n$ is an anion, such as $BF_4^-$, $PF_6^-$, $AsF_6^-$, $SbF_6^-$, $SbCl_6^-$, $HSO_4^-$, $ClO_4^-$, etc. Other onium catalysts are known from EP 703236 or U.S. Pat. No. 5,866,261, such as $B(C_6F_5)_4^-$ salts. Furthermore, onium catalysts include diazonium salts, such as, for example 4-morpholino-2,5-dimethoxy-phenyldiazonium-fluoroborate.

For hardening by hydrosilylation. i.e. if alkenyl-functional polydiorganosiloxanes are used, the catalysts (B) are selected from the group of photo-activatable hydrosilylation catalysts, in particular metal compounds, such as those of Ag, Co, Fe, Ir, Os, Ni, Pd, Pt, Rh and Ru.

Examples for photo-activatable platinum catalysts include the (η-diolefin)(σ-aryl)-platinum complexes, as disclosed in U.S. Pat. No. 4,530,879 A: (wherein "COD" means cyclooctadiene, "COT" cyclooctatetraene, and "NBD" norbornadiene):
(1,5-COD)diphenylplatinum
(1,3,5,7-COT)diphenylplatinum
(2,5-NBD)diphenylplatinum
(3a,4,7,7a-tetrahydro-4,7-methanoindene)diphenylplatinum
(1,5-COD)-bis(4-methylphenyl)platinum
(1,5-COD)-bis(2-methylphenyl)platinum
(1,5-COD)-bis(2-methoxyphenyl)platinum
(1,5-COD)-bis(3-methoxyphenyl)platinum
(1,5-COD)-bis(4-phenoxyphenyl)platinum
(1,5-COD)-bis(4-methylthiophenyl)platinum
(1,5-COD)-bis(3-chlorophenyl)platinum
(1,5-COD)-bis(4-fluorophenyl)platinum
(1,5-COD)-bis(4-bromophenyl)platinum
(1,5-COD)-bis(4-trifluoromethylphenyl)platinum
(1,5-COD)-bis(3-trifluoromethylphenyl)platinum
(1,5-COD)-bis(2,4-bis(trifluoromethyl)phenyl)platinum
(1,5-COD)-bis(4-dimethylaminophenyl)platinum
(1,5-COD)-bis(4-acetylphenyl)platinum
(1,5-COD)-bis(trimethylsilyloxyphenyl)platinum
(1,5-COD)-bis(trimethylsilylphenyl)platinum
(1,5-COD)-bis(pentafluorophenyl)platinum
(1,5-COD)-bis(4-benzylphenyl)platinum
(1,5-COD)-bis(1-naphthy)platinum
(1,5-COD)-naphthylphenylplatinum
(1,5-COD)-bis(2H-chromen-2-yl)platinum
(1,5-COD)-bis(xanthene-1-phenyl)platinum
(1,3,5-cycloheptatriene)diphenylplatinum
(1-chloro-1,5-COD)diphenylplatinum
(1,5-dichloro-1,5-COD)diphenylplatinum
(1-fluoro-1,3,5,7-COT)diphenylplatinum
(1,2,4,7-tetramethyl-1,3,5,7-COT)-bis(4-methylphenyl) platinum
(7-chloro-2,5-NBD)diphenylplatinum
(1,3-cyclohexadiene)diphenylplatinum
(1,4-cyclohexadiene)diphenylplatinum
(2,4-hexadiene)diphenylplatinum
(2,5-heptadiene)diphenylplatinum
(1,3-dodecadiene)diphenylplatinum
bis[$\eta^2$-2-(2-propenyl)phenyl]platinum
bis[$\eta^2$-2-(ethenylphenyl)platinum
bis[$\eta^2$-2-(cyclohexene-1-ylmethyl)phenyl]platinum. Other photo-activatable catalyst include ($\eta$-diolefin) (sigma-alkyl)-platinum complexes, such as
(1,5-COD)Pt(methyl)$_2$
(1,5-COD)Pt(benzyl)$_2$
(1,5-COD)Pt(hexyl)$_2$.

Particularly preferred catalysts, with regard to their reactivity and hardening rate, include: ($\eta^5$-cyclopentadienyl)-trialkyl-platinum complex compounds, with (Cp=cyclopentadienyl), such as
(Cp)trimethylplatinum
(Cp)ethyldimethylplatinum
(Cp)triethylplatinum
(Cp)triallylplatinum
(Cp)tripentylplatinum
(Cp)trihexylplatinum
(methyl-Cp)trimethylplatinum
(trimethylsilyl-Cp)trimethylplatinum
(phenyldimethylsilyl-Cp)trimethylplatinum
(Cp)acetyldimethylplatinum
(Cp)diethylmethylplatinum
(Cp)triisopropylplatinum
(Cp)tri(2-butyl)platinum
(Cp)triallylplatinum
(Cp)trinonylplatinum
(Cp)tridodecylplatinum
(Cp)tricyclopentylplatinum
(Cp)tricyclohexylplatinum
(chloro-Cp)trimethylplatinum
(fluoro-Cp)trimethylplatinum
(Cp)dimethylbenzylplatinum
(triethylsilyl-Cp)trimethylplatinum
(dimethylphenylsill-Cp)trimethylplanum
(methyldiphenylsilyl-Cp)trimethylplatinum
(triphenylsilyl-Cp)trihexylplatinum
[1,3-bis(trimethylsilyl)-Cp]trimethylplatinum
(dimethyloctadecylsilyl-Cp)trimethylplatinum
1,3-bis[(Cp)trimethylplatinum]tetramethyldisiloxane
1,3-bis[(Cp)trimethylplatinum]dimethyldiphenyldisiloxane
1,3-bis[(Cp)dimethylphenylplatinum]tetramethyldisiloxane
1,3,5-tris[(Cp)trimethylplatinum]pentamethyltrisiloxane
1,3,5,7-tetra[(Cp)trimethylplatinum]heptamethyltetrasiloxane
(methoxy-Cp)trimethylplatinum
(ethoxymethyl-Cp)ethyldimethylplatinum
(methyoxycarbonyl-Cp)trimethylplatinum
(1,3-dimethyl-Cp)trimethylplatinum
(methyl-Cp)triisopropylplatinum
(1,3-diacetyl-Cp)diethylmethylplatinum
(1,2,3,4,5-pentachloro-Cp)trimethylplatinum
(phenyl-Cp)trimethylplatinum
(Cp)acetyldimethylplatinum
(Cp)propionyldimethylplatinum
(Cp)acryloyldimethylplatinum
(Cp)di(methacryloyl)ethylplatinum
(Cp)dodecanoyldimethylplatinum, and
trimethylplatinum-cyclopentadienyl-terminated polysiloxanes. Most preferred are, optionally, alkyl or trialkylsilyl-substituted cyclopentadienyl-tris-alkyl-platinum compounds, cyclopentadienyl-tris-(triorganosilyl)alkyl-platinum compounds, in particular alkylcyclopentadienyl-trimethyl-platinum, such as methylcyclopentadienyl-trimethyl-platinum.

The quantity of the component (B) for the systems hardening by a hydrosilylation reaction expediently is about 0.1-1000 ppm, preferably 0.5-500 ppm, more preferably 1-100 ppm, particularly preferably 2-50 ppm, still more preferably 2-20 ppm, computed as metal and relative to the weight of the component (A).

The cross-linking rate is determined, among other things, by the selected catalyst compound, the quantity thereof and also by the type and quantity of the optionally used additional components (D), the inhibitor for the hydrosilylation reaction.

The catalyst concentration for the radically hardenable compositions for the photo-activatable (B) is 0.01 to 5 parts by weight, more preferably 0.01 to 0.5 parts by weight per 100 parts by weight of the component (A).

For the cationically hardening compositions the quantities of the photo-activatable catalyst (B) are selected to be up to 5 parts by weight per 100 parts by weight of the component (A). Preferably, the catalyst (B) is added in the smallest possible quantity with which the composition can be hardened.

Less than 0.01 parts of the photo-activatable catalyst (B) in radically or cationically hardenable compositions often are insufficient to harden the silicone rubber composition. With more than 5 parts of the photoinitiator (B), the light transmittance may be reduced so that the hardening reaction may take too long.

The photo-hardenable compositions based on the component (A) comprising polymers, oligomers and/or monomers, which comprise one or more photo-reactive groups, such as, in particular, flowable silicone rubber compositions comprising for example (A1) and/or (A2) optionally contain one or more sensitizers (C). Sensitizers (C) are compounds that are capable of absorbing the electromagnetic radiation within the visible range of the light spectrum, i.e. 400 nm to 800 nm, and which can transfer this energy onto the catalyst. Expediently, they should have an energy of the triplet term of at least 130 kJ/mol Representative example include, for example polycyclic aromatic sensitizers, such as anthracene, 9-vinylanthracene, 9,10-dimethylanthracene, 9,10-dichloroanthracene, 9,10-dibromoanthracene, 9,10-diethylanthracene, 9,10-diethoxyanthracene, 2-ethyl-9,10-dimethylanthracene, naphthacene, pentacene, benz[a]anthracene, 7,12-dimethylbenz[a]anthracene, azulene, aromatic ketones, such as 2-chlorothioxanthone, 2-isopropylthioxanthone, thioxanthone, anthraquinone, benzophenone, 1-chloroanthraquinone, bianthrone and the like.

In the case of silicone rubber compositions hardening by hydrosilylation reaction comprising, for example, the components (A1) and/or (A2), they optionally contain one or more inhibitors (D) which affect the rate of the hydrosilylation reaction. The cross-linking reaction can thus be influenced, and it can be ensured, for example, that the hydrosilylation reaction does not begin to harden silicone rubber compositions prematurely, particularly outside the mold cavities. Examples of the inhibitors known per se include, for example: ethylenically unsaturated amides (U.S. Pat. No. 4,337,332); acetylenic compounds (U.S. Pat. No. 3,445,420, U.S. Pat. No. 4,347,346), isocyanates (U.S. Pat. No. 3,882,083); unsaturated siloxanes, (U.S. Pat. No. 3,989,667); unsaturated diesters (U.S. Pat. No. 4,256,870, U.S. Pat. No. 4,476,166 and U.S. Pat. No. 4,562,096), hydroperoxides (U.S. Pat. No. 4,061,609), ketones (U.S. Pat. No. 3,418,731); sulfoxides, amines, phosphines, phosphites, nitrils (U.S. Pat. No. 3,344,111), diaziridines (U.S. Pat. No. 4,043,977), such as alkinols, as described in U.S. Pat. No. 3,445,420, such as ethinylcyclohexanol and 3-methylbutinol and unsaturated carboxylic acid esters (U.S. Pat. No. 4,256,870) as well as diallylmaleate and dimethylmaleate and the fumarates of U.S. Pat. No. 4,562,096 and U.S. Pat. No. 4,774,111, such as diethylfumarate, diallylfumarate or bis-(methoxyisopropyl)maleate, moreover vinylsiloxanes, such as 1,3-divinyltetramethyldisiloxane or tetravinyltetramethyltetracyclosiloxane.

The quantity of the inhibitor component is selected in such a way that the desired cross-linking time can be suitably adjusted under the selected processing conditions, i.e. time and temperature, in particular adapted to the catalyst (B) and the other components. The quantity of the inhibitor component is preferably 0.0001 to 2% by wt. of one or more inhibitors, relative to the quantity of the component (A).

Optionally, the photo-hardenable flowable polymer, oligomer, and/or monomer composition, such as, for example, the photo-hardening silicone rubber composition, comprises one or more component(s) (E) that are reactive with respect to the component (A) and which build chemical bonds with (A) in the sense of polymerization, oligomerization or cross-linking.

In the case of the alkenyl-functional polyorganosiloxanes (A) that harden by hydrosilylation, the photo-hardening silicone rubber compositions mandatorily comprise SiH-functional polyorganosiloxanes as the component (E). In that case, at least one of the components (A) or (E) preferably comprises a higher functionality than 2, so that cross-linked structures are formed. As SiH-functional polyorganosiloxanes (E), the SiH-functional polyorganohydrogensiloxanes, for example, are selected from the group of the linear, cyclic or branched SiH-containing polyorganosiloxanes, such as

 (2a)

 (2b)

 (2c)

 (2d)

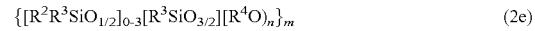 (2e)

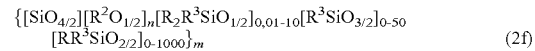 (2f)

with
z=0 to 1000
p=0 to 100
z+p=1 to 1000
n=0.001 to 4
m=1 to 1000,
wherein $R^2O_{1/2}$ is an alkoxy residue on the silicon,
$R^3$=hydrogen or R, as defined above, preferably $C_1$-$C_{12}$-alkyl, $C_1$-$C_{12}$-alkoxy($C_1$-$C_{12}$)-alkyl, $C_5$-$C_{30}$-cycloalkyl or $C_6$-$C_{30}$-aryl, $C_1$-$C_{12}$-alkyl($C_6$-$C_{10}$)-aryl, wherein these residues can optionally be respectively substituted by one or more F atoms and/or can contain one or more O groups, provided that at least two residues $R^3$ per molecule are hydrogen.

In this system, which hardens by hydrosilylation, the ratio of the component (E) to the component (A) is preferably selected in such a way that a molar ratio of Si—H to Si-alkenyl units of about 0.5 to 20:1, preferably of 1 to 3:1, is provided. The preferred amount of the polyorganohydrogensiloxanes used as the component (E) is 0.1 to 200 parts by weight relative to 100 parts by weight of the component (A). Many properties, such as the rubber-mechanical properties, the cross-linking rate, stability and surface tack can be influence via the molar ratio of SiH to Si-alkenyl units.

The polyorganohydrogensiloxanes (E) can be linear, branched or cyclic. The polyorganohydrogensiloxane has, for example a viscosity of about 5 to 1000 mPa·s at 25° C.

In the case of the radically hardening silicone compositions, wherein, in particular, alkenyl or methacryloyl-functional polydiorganosiloxanes (A) are used, polyfunctional mercapto compounds can optionally be used as cross-linking agents, such as those mercapto compounds mentioned in EP 832936 A1, particularly mercaptosilanes or mercaptopolysiloxanes with 2 to 50 mercapto groups. Polyfunctional monomers, oligomers or polymers comprising radically cross-linkable groups can substantially also be used without limitation, such as polyalkenyl compounds, such as glycerintri(meth)acrylate, trimethylolpropanetri(meth)acrylate, pentaerythrite-tri(meth)acrylate or pentaerythrite-tetra(meth)acrylate.

The photo-hardenable compositions used according to the invention can optionally comprise one or more fillers as the component F, as they are commonly used in photo-hardenable compositions, such as silicone rubbers, provided they let through a sufficient amount of photo-activating UV light. Thus, reinforcing fillers are expediently preferred that do not comprise any light-scattering aggregates, i.e. preferably those smaller than 200 nm. Reinforcing fillers (F) that meet this condition are, for example, selected from the group which includes: organic and inorganic resins that are solid at 25° C., such as silsesquioxanes, metal oxides or metal oxide hydroxide gels, such as, for example, of Al, B, Ce, Ga, In, Si, Zn, Ti, Sn, Sb. Silicic acids or silica gels with an average primary particle size in the range of 5-20 nm and specific surfaces according to BET of 150 to 400 m²/g are preferred, which are produced in accordance with various methods, such as by flame hydrolysis, precipitation methods, sol-gel methods, etc. Examples include: pyrogenic silicic acids, such as Aerosil (Degussa), HDK (Wacker), Cab-O-Sil (Cabot).

The term filler (F) also means fillers with hydrophobing agents or dispersing agents or process aids bonded to the surface, which influence, preferably reduce, the interaction of the filler with the polymer, such as the thickening effect. Preferably the known silicon compounds are used for the corresponding surface treatment of the filler, in order to achieve this hydrophobing effect. Alkyl or alkenylsilanes or alkyl or alkenylsiloxanes are preferred. The surface treatment can be carried out, for example, 'in situ' by adding silazanes, such as hexamethyldisilazane and/or 1,3-divinyltetramethyl-disilazane with water being added. This so-called 'in-situ'-hydrophobing is preferred. It can also take place with other common filler treating agents, such as vinylalkoxysilanes, e.g. vinyltrimethoxysilane, other silanes with unsaturated organofunctional groups, such as methacryloxypropyl, epoxyalky or mercaptoalkyltrialkoxysilanes. Polyorganosiloxanedioles with chain lengths of 2 to 50 that carry unsaturated organic or other organofunctional residues in order to provide reactive sites for the cross-linking reaction are also known. Examples for commercially available silicic acids hydrophobed in advance with various silanes are: Aerosil R 972, R 974, R 976 or R 812 or, for example HDK 2000 or H30. Examples of trade names for so-called hydrophobed precipitated silicas, English 'wet silicas', are Sipernat D10 or D15 by Degussa. The pre-hydrophobed silicic acids are less preferred than the silicic acids hydrophobed 'in situ' with silazanes. By selecting the quantity of filler type, its quantity and the type of hydrophobing, the rubber-mechanical properties and the rheological, i.e. processing-related properties of the silicone rubber mixtures can be influenced. Other preferred fillers are the highly-transparent silicic acids which are produced by hydrolysis and condensation of tetraalkoxysilanes and hexamethyldisilazane and/or 1,3-divinyltetramethyl-disilazane. For explanatory purposes, U.S. Pat. No. 4,344,800, which defines these silicic acids by way of example, is quoted here.

For the production of molded articles from photo-hardenable polymer compositions, it preferably selects from compositions containing:
  a) 100 parts by weight of at least one alkenyl group-containing polyorganosiloxane (A) with a viscosity range of 0.01 and 100 Pa·s (25° C.; shear rate gradient D of 1 s⁻¹),
  b) 0.5 to 1000 ppm of at least one photo-activatable hydrosilylation catalyst (B), computed as metal relative to the quantity of the components (A) to (B),
  c) optionally one or more sensitizers,
  d) optionally 0.0001 to 2% by wt. of one or more inhibitors relative to the quantity of the components (A) to (E), and optionally further auxiliary substances.
  e) 0.1 to 200 parts by weight of at least one polyorganohydrogensiloxane (E), wherein 0.5 to 20 mol, preferably 1 to 5 mol of the SiH groups per mol of the alkenyl groups are used in (A),
  f) 0 to 100 parts by weight of one or more fillers.

These polyorganosiloxane compositions can be hardened with UV light in the integral irradiation and molding device according to the invention in a short period of time and removed from the mold without any major adhesion-related problems even in large layer thicknesses or volumes.

The integral irradiation unit according to the invention for hardening the above-mentioned light-hardening polymer compositions comprises one or more UV light sources.

The term UV light within the context of the present invention means an electromagnetic (actinic) radiation which is capable of hardening the flowable, photo-hardenable polymer compositions, in particular silicone rubber compositions. The term 'photo-activatable' is used in the sense of 'light-activatable'. Preferably, ultraviolet light with a maximum of the spectral distribution of the wavelengths in the range of from 300 to 500 nm, in particular ultraviolet light of a wavelength in the range of from 300 to 400 nm is used.

The UV light sources according to the invention particularly are such UV light sources in which the percentage of the total radiation in the range of >700 nm is less than 15%, and in the range <300 nm is less than 15%.

The total radiation mentioned herein relates to the quantity of radiation incident upon the transparent element of the integral irradiation unit. The term UV light source therefore includes all elements of the irradiation unit inclusive of possible wavelength-sensitive filter or dichroic mirror elements.

UV light sources in which the percentage of the total radiation in the range of >700 nm is less than 15%, and in the range <300 nm is less than 15%, are thus characterized in that they provide radiation substantially in that range of the spectrum in which an activation of the hardening of the light-hardening polymer compositions takes place. This wavelength range is the wavelength range in which the activation of the light-hardening polymer compositions or the reaction rate of the hardening process is at maximum. This wavelength range depends on the light-hardening polymer composition used, the catalysts, inhibitors, sensitizers used therefor, etc. In the case of the polymer compositions hardening by hydrosilylation, which are preferred according to the invention, the range of maximum activation or highest hardening rate is generally at about 345 to 385 nm. By using UV light sources with a particularly low percentage of radiation in the range of >700 nm or <300 nm, the energy-rich percentage of UV light which is harmful to some materials for transparent elements (transparent materials) is, on the one hand, reduced, and at the same time the percentage of heat radiation which is harmful both to the transparent materials as well as to the light-hardening polymer composition is avoided. The energy-rich UV radiation (wavelength range <300 nm), as was already explained at the beginning, particularly leads to the premature ageing of the transparent plastic mold materials, such as PMMA, which is expressed, for example, in yellowing, embrittlement and deformation, and finally by the failure of the mold cavity, and leads to high production costs. On the other hand, an excessive heat radiation of the UV light sources in the wavelength range of >700 nm leads to possible deformations of the transparent elements or of the mold cavities, which also renders them unusable, or the heat has to be dissipated with a lot of effort from the irradiation unit, which prevents a compact build of the irradiation unit. If using UV light sources that inherently have a percentage of the total radiation in the range of >700 nm of less than 15% and in the range <300 nm of less than 15%, such as UV LED lamps with a maximum of the radiation in the range between 300 and 450 nm and low width of the radiation distribution, for example of +/−25 nm, the energy used is moreover maximally converted into a radiation serving for activation, which makes the method particularly energy-efficient.

The percentages of the total radiation of the UV light source in the range of >700 nm and <300 nm can be determined, for example, by irradiating an appropriate measuring device, in particular a (spectral) photometer, photoelectric cells or a bolometer.

UV light sources that meet these requirements in particular include UV lamps with wavelength-selective filters and/or mirrors, UV LED and UV laser light sources.

Basically, all conventional UV lamps in which the amount of radiation in the wavelength range of <300 nm and >700 nm is suitably limited, or such UV lamps which, for systemic reasons, generate their UV radiation in a narrow wavelength range, such as UV LED lamps or UV lasers, are suitable as UV light sources.

Examples of conventional UV lamps include: UV fluorescent lamps, high-pressure mercury lamps, UV arc lamps, metal halide lamps, xenon lamps, flash lamps, non-doped or Fe or Gallium-doped mercury lamps, black-light lamps, whose radiation is suppressed in the range of <300 nm and >700 nm, in particular by using wavelength-selective filters and/or mirrors.

Examples of UV lamps which, already for systemic reasons, generate their UV radiation in a narrow wavelength range include, for example, UV LED lamps or UV lasers, such as excimer lasers. They are preferred because of their low heat development.

Particularly such light sources are preferably selected according to the invention, whose energy input is converted as completely as possible into a UV light that can be used for light-hardening. These light sources have almost no percentage of heat radiation any more. Preferably, the percentage of heat radiation with a wavelength between 700-10000 nm is less than 10% of the total radiation. Though screening by wavelength-selective mirrors or filters is also capable of reducing the percentage of heat radiation by up to 85%, this effect is not always sufficient to prevent the transparent shaping elements from heating up to an undesirably high extent and is traded off against an increased need for space. Thus, the entire device does not always find room in an injection molding machine. Moreover, energy losses are higher. According to the invention, UV light sources with a selected, limited wavelength spectrum are preferred, i.e. with only little heat radiation >700 nm and UV radiation <300 nm and with compact constructional dimensions. They are preferred as a UV light source for providing the integral irradiation unit with transparent elements as a component of a mold cavity, in particular if they consist of thermoplastic synthetic materials and are attached at a small distance to these UV light sources. The use of these light sources permits a compact design of the integral irradiation and molding unit. According to the invention, the light sources are therefore preferably selected from the group of UV LED lamps and UV lasers. Examples of such light sources are UV LED lamps such as LED Powerline and LED PowerPen by the company Hönle, LED lamps by the company Dr. Gröbel Ettlingen, or LED lamps by the company Phoseon Technology, such as the models FRDA 202, FRDA75. Also particularly suitable are UV lasers, for example by Crystal Laser Systems Berlin, for example the model FDSS 355-300 plus or models with a corresponding power in the UV wavelength range by Mikrooptik LIMO Lissotschenko Mikrooptik GmbH in Dortmund. The laser light sources moreover preferably require a micro-optical system for the planar distribution or expansion of the narrowly concentrated laser beam in front of the transparent element in the integral molding and irradiation unit. The aforementioned radiation sources generate UV light with a maximum in the wavelength range 300-500 nm, the range of 250-400 nm being preferred, still more preferably 320-385 nm.

Conventional UV lamps in which the selected UV light spectrum is generated by using suitable filters and dichroic mirrors include, for example, UV-Print HPL by Hönle in Gräfeling/Munich.

For the respective photo-activatable polymer compositions, preferably very narrow wavelength ranges of ±20 nm about a desired maximum value, for which almost more than 80% of the irradiated radiation input is available for photo-hardening, can be selected by using UV LED radiation sources. For example, the sigma-platinum catalysts (B) can preferably be activated with LED UV light sources in the range 365±20 nm.

The UV light sources used expediently have an output of 0.1-12000 mW/cm$^2$.

In order to completely reach the surface to be irradiated, several irradiation sources in an integral irradiation unit can be arranged in a planar, optionally connected manner to form an irradiation panel.

The mold cavities which are provided in the integral irradiation unit according to the invention can be partially transparent, completely or non-transparent to UV light. The case of the non-transparent mold cavities can occur if the irradiation of the light-hardening polymer compositions takes place outside of the mold cavity, for example in an injection gate, which requires a correspondingly suitably long pot life or gelling time of the light-hardening polymer compositions in order to transfer the irradiated polymer composition into the mold cavity without it previously hardening to an extent preventing the transfer into the mold cavity.

The mold cavity can be formed of conventional materials, such as ceramics, metal, plastic and/or glass, with their surfaces preventing an adhesion of the hardened polymer compositions either per se or due to an appropriate finishing. The selection of the mold cavity material is therefore particularly dependent upon the adhesive properties or the mutually limited solubility of the polymer composition to be hardened. Where, for example, the preferred case of the photo-hardened silicone composition is concerned, non-adhering mold cavity materials consisting of transparent materials, such as poly(meth)acrylates and/or non-transparent materials, such as optionally coated metals, are being used. Conversely, in particular a mold cavity based on transparent silicones and/or optionally coated metals or transparent plastics can be used in the case of photo-hardening polymer compositions based on acrylates.

Easily processable materials, such as plastics or metal, are preferred. If the mold cavities are constructed partially or completely from transparent elements, they preferably consist of transparent plastics as listed further below for the transparent elements. If the mold cavities consist only in part of transparent element, or if they are wholly non-transparent, then the non-transparent elements preferably consist of metal.

The size of the mold cavities is dependent upon the mold to be prepared. Basically, the integral irradiation unit of the invention can be given any size provided that the dimensions selected permit a sufficient radiation hardening of the light-hardening polymer composition. Thus, the mold cavities can have a longest dimension of up to 10 m and a volume of up to 300 liters, for example for the purpose of accommodating large-volume electrical insulator components. The longest dimension of the molded body can be more than 0.5 m, preferably more than 1 m. In the case of large volumes, at least about 0.5 liters, more preferably at least about 3 liters, still more preferably at least about 10 liters are preferred. Optimum results can be achieved with the integral irradiation unit of the invention particularly in the case of large-volume molded bodies with a volume of at least about 20 liters, because the high radiation power required in this case can be provided with a low heat development, without the mold cavities or the transparent elements being affected, i.e. without thermal deformation, tension cracks or adhesion.

The shortest diameter for these large-scale cast parts is generally at least about 1 cm, preferably at least about 5 cm, still more preferably at least about 10 cm.

In another embodiment, very small molded articles, down to the microliter range, can be produced by the injecting molding process. These molded articles, for example, have a volume between 0.001-500 mL and a smallest thickness of 0.01 to 10 mm. The use of the compact integral irradiation and molding unit is advantageous also in this case because in this dimensional range, injection molding machines can advantageously be used which permit the largely automated production of UV light-hardened molded articles.

For removing the hardened articles, the mold cavities have to be capable of being opened. This means that they generally are formed from at least two detachably interconnected shaping elements that jointly have one or more separating planes. After the photo-hardening polymer composition has hardened, the shaping elements are detached from each other, and the hardened molded body or molded article can be removed. This can be carried out automatically by correspondingly disposed ejectors or by using compressed air.

The integral irradiation unit comprises one or more elements which are transparent for the UV light and which are in contact with the photo-hardening polymer composition. The UV light-transparent elements can in this case form the mold cavity in part or completely, as was explained above. However, they can also be arranged exclusively or additionally outside the mold cavity. If they are arranged exclusively outside of the mold cavity, particularly on the injection gate, then the pot life has to be sufficient for transferring the light-hardening polymer composition into the mold cavity. The materials for the transparent elements or the window materials, which optionally also form the mold cavity completely, are for example selected from the following group: acrylates, in particular polymethacrylate (PMMA), such as Plexiglas® Roehm and Haas Evonik, polyethylene-dicylopentadiene-polymer (COC), such as Apel® Mitsui Chemicals Topas® COC, Crystal® DEW, quartz glass, polymethacrylmethylimide (PMMI), i.e. partially imidated methacrylpolymerisates such as, e.g., those under the brand name Kamax®, in Europe by Röhm under the brand name Pleximid®, polyorganosiloxanes, such as by Momentive Performance Materials, which can optionally be surface-coated in an anti-adhesive manner. Among other things, it was found that PMMA of the usual industrial grade cannot be used due to too strong an absorption of UV light. Rather, such PMMA types are suitable which have a high UV light transmittance, in which UV stabilizers, in particular, are substantially excluded from production. Examples of such PMMA types include, for example Plexiglas® 0Z18.

Similarly, UV-absorbing additives must preferably be avoided in other materials used for the production of the transparent elements, or be replaced by suitable, low-absorption additives, or wholly avoided.

The UV light-transparent elements are dimensioned in such a way that they are able to withstand the internal mold pressure (such as, for example, those having a thickness of at least about 1 mm, preferably at least 5 mm, still more preferably at least about 25 mm).

At the same time, a sufficiently large penetration area for the UV light to be irradiated must be provided in order to permit a sufficiently fast hardening process.

The required penetration area depends on the required UV radiation energy, the desired hardening time and the available power of the UV light sources in order to be capable of production in economically viable cycle times of 1-600 s/molded article. Given radiation powers of up to 12 W/cm$^2$, transparent penetration areas for the UV light of 0.1 to $1 \cdot 10^4$ cm$^2$ will expediently be offered, preferably 1-100 cm$^2$ per lamp or lamp panel.

In order to increase the radiation penetrating the transparent elements and to shorten the hardening time, the light of several UV light sources can be concentrated, particularly by means of suitable mirrors and/or lenses. This may possibly be required particularly in the case of small transparent elements because their surface area is too small to absorb the light of several UV light sources. Or, in other words, a concentration is useful in cases where the radiation surface area of the UV light source is larger than the surface area of the transparent element.

As such, the transparent elements can be used for constructing the entire mold cavity, or only parts of the mold cavity are opened for the entry of light by the transparent element.

In order to improve the effect of the radiation, the integral irradiation unit of the invention can optionally comprise one or more light-conducting and/or light-reflecting elements. This embodiment, for example, is suitable in cases where the mold cavities have shadowed areas, for example also due to inserts present in the mold cavity, which direct the UV light by reflection or light conduction into the desired area of the mold cavity or into the photo-hardening mass provided there. Suitable light-conducting and/or light-reflecting elements include, for example: mirrored elements, such as spherical mirrored elements, which generate a concave light reflection, or planar mirrored elements, light conductors, such as glass-fiber bundles etc. The light-conducting and/or light-reflecting elements can be disposed outside or within the mold cavity, so that they are part of the shape. For example, if a spherical hollow space in the mold cavity is provided, a correspondingly shaped spherical reflecting element can be disposed in the interior of the mold cavity.

Preferably, the integral irradiation unit comprises one or more injection gates for the light-hardening polymer composition, by means of which the light-hardening polymer composition can be injected into the mold cavity, optionally after a previous or simultaneous irradiation. Depending on the desired injection rate (volume/unit of time), the injection gates have a diameter of, for example, 0.5-8 mm. The dimensions of the gate or gate land are preferably in the range of 0.2-10 mm.

In cooperation with the injection gates, the mold cavity preferably must have a pressure difference relative to the external pressure, in order to permit, in particular, a bubble-free filling process of the mold cavity. The pressure difference can be, for example, at least about 0.1 bar, preferably at least about 0.5 bar. This includes a filling process while applying a vacuum to the mold cavity.

Furthermore, the integral irradiation and molding unit can comprise venting ducts, which serve for venting when the mold cavities are filled in order to obtain a bubble-free hardened article. Such venting ducts have, for example, a diameter of at least about 1 mm. In addition, the separating joints of the mold cavities can serve for venting.

Preferred embodiments of the irradiation and molding unit according to the invention comprise one or more of the following features:

a) The distance between the UV light sources and the UV light-transparent elements is fixed or variable, preferably fixed,
b) The direction of irradiation of the UV light is variable in order to optionally be able to irradiate a larger area within the mold cavity, or surface areas that are larger than the surface area of the emitting light sources,
c) The distance between the UV light sources and the UV light-transparent elements is less than 150 mm, preferably less than 100 mm, more preferably less than 50 mm, still more preferably less than 40 mm, even more preferably less than 25 mm, still more preferably less than 10 mm, still more preferably less than 7 mm,
d) The transparent elements are selected from quartz glass or a polymer material which is preferably selected from the group consisting of acrylic polymers, particularly PMMA,
e) The integral irradiation unit consists of several partial components, such as the UV light source, several optionally replaceable mold cavity segments, injection elements, comprising injection gates, valves, mixing elements etc., which form the irradiation unit when assembled,
f) The integral irradiation unit comprises one or more injection gates, at least one of which optionally comprises transparent elements which are penetrated by radiation from at least one UV light source,
g) The mold cavities have no sections that are transparent to the UV light sources, irradiation takes place outside of the mold cavity prior to injection into the mold cavity,
h) The mold cavities are constructed partially or completely from transparent elements,
i) The integral irradiation unit comprises several UV light sources,
j) The UV light source is an LED light source,
k) The UV light source has a power of at least 0.1 mW/cm$^2$,
l) The integral irradiation unit is suitable for the continuous or discontinuous production of hardened molded polymer bodies or for the production of bodies that comprise a hardened polymer layer,
m) The light-hardening polymer compositions are light-hardening silicone compositions, preferably silicone compositions hardening by hydrosilylation reaction, which preferably comprise platinum complex compounds as catalysts, particularly sigma-alkyl-platinum complex compounds,
n) The UV light source is selected from UV lamps with wavelength-selective filters and/or mirrors, UV LED and UV laser light sources.

The invention moreover relates to a method for producing molded articles or molded bodies from hardened polymers or bodies coated with hardened polymers, wherein one or more light-hardening polymer compositions are hardened using the integral irradiation unit according to the invention. The method expediently comprises the following steps:

i) Optionally assembling the components of the irradiation unit, particularly of the mold cavity,
ii) Providing the photo-hardening polymer composition, optionally while mixing of partial components,
iii) Optionally inserting one or more bodies to be coated into one or more mold cavities,
iv) Filling one or more light-hardening polymer compositions into at least one or all provided mold cavities, optionally through one or more injection gates,
v) Irradiating the light-hardening polymer compositions through one or more transparent sections in the area of the injection gates and/or the mold cavities,
vi) Continuous or discontinuous removal of the hardened molded polymer bodies or of the polymer-coated bodies.

The invention furthermore relates to a method for producing hardened molded polymer bodies or bodies coated with hardened polymers, wherein one or more light-hardening polymer compositions are hardened using the integral irradiation unit according to the invention, which comprises the following steps:

a) Determining the wavelength range effective for activation of the hardening process,
b) Selection of a suitable UV light source, whose maximum of radiation lies in the effective wavelength range.

The wavelength range effective for the activation of the hardening process is the wavelength range in which the activation of the light-hardening polymer compositions or the reaction rate of the hardening process is at maximum. This wavelength range depends on the light-hardening polymer composition used, the catalysts, inhibitors, sensitizers used therefor, etc. In the case of the polymer compositions hardening by hydrosilylation, which are preferred according to the invention, the range of maximum activation or highest hardening rate is generally at about 345 to 385 nm.

The invention moreover relates to the use of the integral irradiation and molding unit according to the invention for producing molded polymer bodies or polymer-coated bodies, such as, for example gaskets, large-volume electrical insulators, such as high-voltage insulators, field control elements, thyristors, cable insulations, cable sleeves, optical connectors for light conductors, cable connectors, encapsulating composites, cable sealing heads, which can optionally consist of several materials, such as conductive, non-transparent elastomers, thermoplastics, which are inserted into the mold cavity beforehand, active substance-containing carrier materials, laminates, cable insulations, seals on food containers of metal or plastics, etc.

Preferably, the aforementioned molded polymer bodies or polymer coatings produced by means of the integral irradiation unit according to the invention consist of silicone materials.

BRIEF DESCRIPTION OF THE DRAWINGS

FIGS. 1, 2a, 2b, and 3 present preferred embodiments of the integral irradiation unit according to the invention.

In FIG. 1 the UV light sources (2) are placed in a basic mold/mold housing (1) in such a way that the mold cavity/the cavity (4) in the UV-transparent mold inserts (3) can be exposed completely. The distance (a) of the UV light source(s) (2) to the UV-transparent mold inserts (3) can be variable or fixed, and is, for example 5-150 mm. This integral construction permits the accommodation and the operation of the integral irradiation and molding unit in the holding device of an injection molding machine, and thus the production of large numbers of parts, in particular with mold inserts consisting of UV-transparent polymers which are inexpensive to produce. The light-hardening polymer can be injected into the integral irradiation and molding unit via a injection molding machine, or directly via a delivery pump, optionally additional static mixers. During operation, the light-hardening polymer is brought into the cavity or mold cavity (4) via at least one injection gate (6), the diameter of which in the distribution duct is preferably 0.5-15 mm and in the area of the gate or gate land preferably 0.2-12 mm. The injection gates can be incorporated into the UV light-transparent basic mold or mold housing (1), so that undesired cross-linking does not occur in the injection gate, or they are integrated into the UV-transparent mold inserts or the mold cavity wall (3) in order to cross-link the material in the injection gate (it can optionally be removed later by deflashing). For a bubble-free filling process, the cavity (4) can be evacuated through a vacuum, such as 10-300 mbar, prior to filling, or venting ducts (7) having a diameter of 0.1-2 mm are incorporated into the mold insert (3), which cross-link during the filling process. The filling rate is, for example 1-1500 cm$^3$/sec. In the process, pressures are reached in the cavity of, for example 0.5-150 bar. Towards the end of the filling process the material pressure in the cavity (4) can again be increased by the delivery unit, such as 5-150 bar, in order to be able to produce bubble-free articles. After the filling process, the UV light source (2) is switched on for a duration of preferably 1-600 sec with a UV intensity of 0.1-12000 mW/cm$^2$ in order to cross-link the light-hardening polymer. Immediately after the exposure time, the mold can be opened by the injection molding machine or the closure unit in the holding device and the article can be demolded.

In FIG. 2 the UV light sources (2) are placed in such a way that the mold cavity/the cavity (4) in the UV-transparent mold cavity walls/inserts (9) can be exposed from the outside. The shadowed area (12) between the UV-transparent cylindrical mold cavity wall (8) (core) and the non-UV-transparent insert (11) (in this case: conductive silicone elastomer) can preferably be more sufficiently irradiated with UV light by mirror elements in a spherical shape or also little flat reflector members (10) conducting the UV light through the UV-transparent mold cavity wall (8) or core towards the shadowed area (12).

Figure 1:
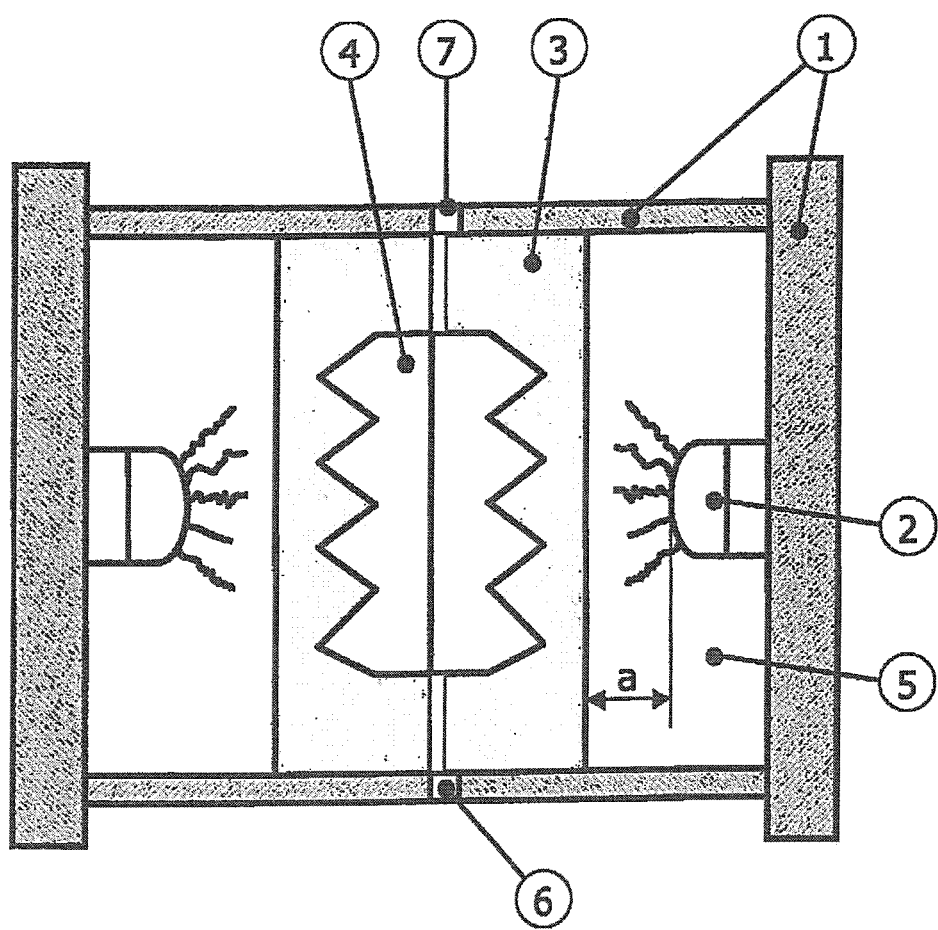

This area can also be irradiated by UV light sources (2) via movable light conductors (13) in FIG. 2b. These light conductors (12) can be designed based on glass fibers, polymeric optical fibers or liquid light conductors.

The elements (2) through (12) are integral parts in a housing (1). The operation of the integral exposure and molding unit described in FIG. 2 can take place as in the description relating to FIG. 1.

In FIG. 3, a UV light source (2) is installed in a metal injection molding tool (15) in such a way that the photo-hardening polymer to be injected is exposed in the injection gate (6) prior to entry into the cavity (4). A UV-transparent insert (14) is incorporated into the injection gate (6). If LED UV light sources are used, the distance (b) of the light source to the transparent mold insert (14) can be, in particular, 0.2-15 mm. The UV-hardening polymer is activated during the filling phase in this gate having a width of, for example 1-20 mm, a height of, for example, 0.1-20 mm, a length over the UV light source (14) of, for example, 1-200 mm, and hardens not until it enters the cavity (4). Due to the possibility of cross-linking at comparatively low material temperatures, this method suggests itself in particular for injection-overmolding plastics with a lower dimensional stability under heat, such as polyolefins, styrenes, polycarbonates and others, as an inserting part/insert (16) in the 2-component injection molding method with silicon rubber.

With the integral irradiation device comprising an irradiation in the injection gate shown in FIG. 3, the mold cavity (4) can of course be used also without an insert (16) for producing single-component molded articles, such as those that completely consist of silicones, such as pacifiers, O-rings, insulators or extrudates such as cable insulation, i.e. an endless strand continuously pulled through the chamber (4), for example a wire, as is usually the case in an extruder crosshead for producing cable insulation, coated light conductors, coated thermoplastic profiles or the like.

Various molded bodies can easily be manufactured with a high degree of productivity from the photo-hardening polymer materials by means of the integral irradiation and molding unit according to the invention. Such molded bodies can be, for example: gaskets, such as flat gaskets with a carrier layer, O-rings, cable insulations, insulators of other molded parts.

The embodiments and examples described only serve for explaining the invention; however, they are not supposed to limit the spirit and the scope of the invention.

EXAMPLES

Example 1

Catalyst Mixture (B)

10,000 parts by wt. of a linear vinyl-terminated polydimethylsiloxane (A1) with a viscosity 1 Pa·s at 25° C. with a vinyl content of 0.13 mmol/g is mixed in the absence of light with 1 part by wt. trimethyl-(methyl)-cyclopentadienylplatinum as the component (B) by the company Street with a platinum content of 61.1%, optionally dissolved while heating to 32° C. The catalyst mixture with 0.006% by wt. Pt metal has to be stored in the absence of light.

Example 2

Preparation of the Basic Mixture 13.5 parts by wt. dimethylvinylsiloxy-terminated polydimethylsilaxane (A1) with a viscosity of 10 Pa·s at 25° C., 24.6 parts by wt. dimethylvinylsiloxy-terminated polydimethylsiloxane (A1) with a viscosity of 65 Pas at 25° C., 4.5 parts hexamethyldisilazane, 0.04 parts by wt. 1,3-divinyltetramethyldisilazand and 1.5 parts by wt. water are mixed in a kneader, then mixed with 17.2 parts by wt. pyrogenic silicic acid (F) with a BET surface of 300 m$^2$/g, heated to about 100° C., stirred for about one hour, and then finally freed from water and excess silazane/silanol residues at 150 to 160° C. by evaporation under vacuum at p=20 mbar. Then, dilution is carried out with 17.4 parts by wt. of a dimethylvinylsiloxy-terminated polydimethylsiloxane (A1) with a viscosity of 10 Pas. The starting material for producing the following partial mixture is obtained.

Partial Mixture 2-1

0.3 parts by wt. of the catalyst (B) with a PT content of 0.006% by wt. as obtained in Example 1 is added under yellow light (absence of light below 700 nm) to the basic mixture (approx. 89.5 parts by wt.) obtained above.

Partial Mixture 2-2

20.8 parts by wt. of a cross-linking agent consisting of trimethylsiloxy-terminated polymethylhydrogen-dimethylsiloxane (E) with a viscosity of 35 mPa·s at 25° C. with a SiH content of 7.4 mmol/g of the general formula $M_2D_{20}D^H{}_{10}$ is added to the basic mixture (89.5 parts by wt.) obtained above and is mixed thoroughly in the basic mixture.

The partial mixtures 2-1 and 2-2 of Example 2 are fed to a static mixer in a volume ratio 90:110 using a piston-type metering pump by the company 2KM and mixed there. Then, the mixture is transferred into the mold cavities of the respective molds.

Example 3a Production of a High-Voltage Shielding Element

The mixture of Example 2 is injected in about 300 s into a mold according to FIG. 1 at a temperature of 20-30° C. over the injection gate (6), and a pressure of 3 bar is maintained by the piston delivery unit. The mold cavity (4) has a volume of 3000 ml. The outer mold cavity wall (3) is completely formed from PMMA type Plexiglas® GS colorless, type 0Z18 by the company Evonik Röhm GmbH (thickness 10 mm, height 250 mm). The transparent mold inserts (3) are screwed to the metal basic form. The metallic mold wall (1) encloses the elements (2) to (7) and, together with them, forms the casing of the integral irradiation and molding unit.

With one UV lamp, respectively, having a selected UV light spectrum (percentage of the total radiation in the range >700 nm less than 15% and in the range <300 nm less than 15%) of the type UVAPRINT 500 HPL, Hönle (2), equipped with a H1 quartz jacket and dichroic reflector mirror as well as a UV filter, light having a radiation maximum in the wavelength range of 345-385 nm is irradiated over 120 s at a distance (a) of 20 mm to the transparent mold cavity wall (3) at an intensity of 40-80 W/cm$^2$, from 2 UV lamps perpendicularly onto one segment, respectively, of the transparent mold cavity wall (3) consisting of PMMA. The UV lamps are air-cooled.

After 120 s, the molded body in the mold cavity (4) is cross-linked to such an extent that a hardness of 25° Shore A is measured on the surface. The molded body exhibits neither bubbles nor a sticky surface. Over 2 min in the process, the transparent mold cavity wall (3) (transparent element consisting of PMMA type 0Z18) has heated up to only 35-45° C.

Example 3b (Comparative Test)

Repetition of the experiment 3a with a standard UVA PRINT 500 HPL light source without dichroic reflector mirror within 2 min leads to the transparent element (3) heating up to more than 90° C., and is thus close to the softening temperature (glass transition temperature) of the acrylate material. The acrylic material yellows after about 100 cycles, UV transparency decreases by about 40%, and micro-cracks appear on the surface.

Example 4a

The partial mixtures 2-1 and 2-2 of Example 2 are injected at a temperature of 20-25° C. into a mold according to FIG. 1 in a volume ratio 90:110 using a metering machine by the company 2KM with piston delivery, as in example 3, and kept at a pressure of 3 bar.

Instead of the UV lamp having a selected UV light spectrum (UVA Print 300 HPL), 2 LED panels by the company Phoseon, each having 300 cm$^2$, which consist of individual LED lamps, are attached perpendicularly to the acrylic window of the type 0Z18 (as described above) on each side of the mold cavity. The distance between the UV light source and the transparent element was 50 mm.

600 W are emitted as UV light in the wavelength range from 345 to 385 (with a percentage of the total radiation in the range >700 nm of less than 15% and in the range <300 nm of less than 15%), which then hit the transparent mold cavity wall (3). After 120 s, the molded body is cross-linked to such an extent that a hardness of 25° Shore A is measured on the surface. The molded body exhibits neither bubbles nor a sticky surface. The mold cavity wall (3) (transparent element consisting of PMMA) in the process has heated up to no more than 25° C. This temperature for the heating-up of the outer mold cavity wall (3) (transparent element) is below the heating-up temperature in example 3a.

Example 4b

The example 4a is repeated, with the lamp being attached at a distance of 5 mm perpendicular to the acrylic window.

After less than 120 s, the molded body consisting of the photo-hardenable silicone partial mixtures of Example 2 is cross-linked to such an extent that a hardness of 25° Shore A can be measured on the surface. The molded body exhibits neither bubbles nor a sticky surface. Until then, despite the reduced distance, the mold cavity wall (3) (transparent element consisting of PMMA) has heated up in the process to no more than 25° C.; even after 3 min, the temperature of the acrylic window is less than 30° C. This temperature for the heating-up of the outer mold cavity wall (3) is in this case below the heating-up temperature in Example 3b.

Examples 4a and 4b show that the replacement of conventional UV lamps with LED UV lamps, in particular for hardening light-hardening silicone compositions, is possible and permits a hardening process in the same or a shorter period of time than is the case with conventional UV light sources. Furthermore, the transparent mold cavity wall (3) consisting of PMMA heats up considerably less or completely fails to heat up. Thus, the selected LED UV light sources can be attached at a smaller distance to, for example, a transparent mold wall than conventional light sources. The usage of the UV LED lamps used in the invention or of other UV light sources with a selected UV light spectrum thus permits the construction of a compact integral irradiation and molding device in which the radiation sources can be installed at a small distance to a transparent, heat-deformable mold cavity wall without putting a strain on the mold cavity wall up to the limit of thermal stability.

The invention claimed is:

1. An integral irradiation unit for hardening light-hardening polymer compositions, comprising:
    at least one UV light source whose percentage of total radiation in a wavelength range of >700 nm is less than 15%, and in a wavelength range <300 nm is less than 15%, wherein the at least one UV light source is configured to provide a wavelength spectrum in which the actuation of the light-hardening polymer compositions and a reaction rate of a hardening process is at maximum,
    at least one mold cavity for receiving light-hardening polymer compositions,
    at least one transparent element that is transparent to UV light generated by the UV light source and is in contact with the light-hardening polymer compositions, wherein the at least one transparent element is made of a polymer material selected from the group of acrylic polymers,
    said integral irradiation unit characterized in that it comprises an interconnected unit of said at least one mold cavity and said at least one UV light source.

2. The integral irradiation unit according to claim 1, for hardening light-hardening polymer compositions, comprising:

at least one UV light source selected from UV lamps with wavelength-selective filters, UV lamps with minors, UV LED, and UV laser light sources, at least one mold cavity for receiving light-hardening polymer compositions, at least one transparent element which is transparent to the generated UV light and which is in contact with the light-hardening polymer compositions.

3. The integral irradiation unit according to claim 1, wherein a distance between the at least one UV light source and the at least one UV light-transparent element is fixed or variable.

4. The integral irradiation unit according to claim 1, wherein a distance between the at least one UV light source and the at least one UV light-transparent element is less than 150 mm.

5. The integral irradiation unit according to claim 1, including several components, which form the integral irradiation unit when assembled.

6. The integral irradiation unit according to claim 1, comprising at least one injection gate, wherein the at least one injection gate comprises transparent elements which are penetrated by radiation from the at least one UV light source.

7. The integral irradiation unit according to claim 1, wherein the at least one mold cavity comprises no sections that are transparent for the at least one UV light source.

8. The integral irradiation unit according to claim 1, wherein the at least one UV light source comprises more than one UV light source.

9. The integral irradiation unit according to claim 1, wherein the UV light source has a radiation of at least 0.1 mW/cm$^2$.

10. The integral irradiation unit according to claim 1, for a continuous or discontinuous production of hardened molded polymer bodies or for a production of bodies that comprise a hardened polymer layer.

11. The integral irradiation unit according to claim 1, wherein the light-hardening polymer compositions are light-hardening silicone compositions.

12. The integral irradiation unit according to claim 1, wherein the at least one UV light source is at least one LED light source.

13. Use of the integral irradiation unit according to claim 1, for producing molded polymer bodies or bodies coated with polymers.

14. The integral irradiation unit according to claim 2, wherein a distance between the at least one UV light source and the at least one UV light-transparent element is less than 150 mm.

15. The integral irradiation unit according to claim 2, wherein the at least one UV light source has a radiation of at least 0.1 mW/cm$^2$.

16. The integral irradiation unit according to claim 1, wherein the at least one transparent element includes poly (methyl methacrylate).

17. The integral irradiation unit according to claim 16, wherein UV stabilizers are substantially excluded from the at least one transparent element.

18. The integral irradiation unit according to claim 1, further comprising at least one of a light-conducting element and a light-reflecting element.

19. The integral irradiation unit according to claim 1, further comprising at least one injection gate for the light-hardening polymer compositions.

20. The integral irradiation unit according to claim 18, further comprising at least one injection gate for the light-hardening polymer compositions.

21. The integral irradiation unit according to claim 2, further comprising at least one of a light-conducting element and a light-reflecting element.

22. The integral irradiation unit according to claim 2, further comprising at least one injection gate for the light-hardening polymer compositions.

* * * * *

UNITED STATES PATENT AND TRADEMARK OFFICE
CERTIFICATE OF CORRECTION

PATENT NO. : 9,731,435 B2  
APPLICATION NO. : 13/579144  
DATED : August 15, 2017  
INVENTOR(S) : Stefan Rist et al.

Page 1 of 1

It is certified that error appears in the above-identified patent and that said Letters Patent is hereby corrected as shown below:

Column 22, Line 51, Claim 1, the word "actuation" should be replace with --activation--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*